United States Patent
Birchler et al.

[11] Patent Number: 6,161,015
[45] Date of Patent: Dec. 12, 2000

[54] METHOD FOR IMPROVING COMMUNICATION COVERAGE IN MULTI-CELL COMMUNICATION SYSTEMS USING LOCATION INFORMATION

[75] Inventors: Mark A. Birchler, Roselle; Lawrence J. Marturano, Mt. Prospect; Mark J. Marsan, Elmhurst, all of Ill.

[73] Assignee: Motorola, Inc., Schuamburg, Ill.

[21] Appl. No.: 09/086,280

[22] Filed: May 28, 1998

[51] Int. Cl.⁷ .................................................. H04Q 7/20
[52] U.S. Cl. ........................ 455/440; 455/438; 455/456
[58] Field of Search ................................ 455/436, 437, 455/438, 440, 456; 370/331, 332; 342/450, 457; 701/300

[56] References Cited

U.S. PATENT DOCUMENTS

| | | | |
|---|---|---|---|
| 5,235,633 | 8/1993 | Dennison et al. | 455/456 |
| 5,267,261 | 11/1993 | Blakeney, II et al. | 370/332 |
| 5,327,575 | 7/1994 | Menich et al. | 455/437 |
| 5,394,158 | 2/1995 | Chia | 342/457 |
| 5,551,058 | 8/1996 | Hutcheson et al. | 455/440 |
| 5,568,153 | 10/1996 | Beliveau | 455/440 |
| 5,574,968 | 11/1996 | Olds et al. | 455/436 |
| 5,613,205 | 3/1997 | Dufour | 455/440 |
| 5,634,192 | 5/1997 | Meche et al. | 455/437 |
| 5,857,155 | 1/1999 | Hill et al. | 455/456 |
| 5,893,033 | 4/1999 | Keskitalo et al. | 455/437 |
| 5,940,761 | 8/1999 | Tiedemann, Jr. et al. | 455/437 |

*Primary Examiner*—Dwayne D. Bost
*Assistant Examiner*—Quochien B. Vuong
*Attorney, Agent, or Firm*—Jeffrey K. Jacobs

[57] ABSTRACT

The present invention provides a method for improving the communication coverage in a multi-cell communication system (100) which employs neighbor cell lists. A cell site (114) provides a communication unit (128) within its cell (112) with communication and a neighbor cell list. The neighbor cell list (200) informs the communication unit of other cells which are possible hand-off targets. When the fixed network equipment (FNE) detects that a particular communication unit (128) has entered another cell and/or needs to hand-off its communication to another cell site but has been denied, the cell site (114) sends the communication unit the neighbor cell list related to the new cell. With a new neighbor cell list (300), the communication unit (128) can now attempt to maintain its communication by handing-off to cells unknown before. In this manner the effective communication coverage of the system is improved.

8 Claims, 5 Drawing Sheets

200 — NEIGHBOR CELL LIST 101
104
120
134
124
108

NEIGHBOR CELL LIST — 300

112
120
136
144
140
124

METHOD FOR IMPROVING COMMUNICATION COVERAGE IN MULTI-CELL COMMUNICATION SYSTEMS USING LOCATION INFORMATION

CROSS-REFERENCE TO RELATED APPLICATION

This application is related to a co-pending application entitled "METHOD FOR IMPROVING COMMUNICATION COVERAGE IN MULTI-CELL COMMUNICATION SYSTEMS", filed on even date herewith, and assigned to the assignee of the instant application.

Field of the Invention

The present invention relates generally to wireless communication systems and, in particular, to improving communication coverage in multi-cell wireless communication systems.

BACKGROUND OF THE INVENTION

Multi-cell wireless communication systems are well known. Such systems have stationary fixed network equipment (FNE) and subscribers which are mobile. The FNE comprises a plurality of cell sites distributed across a geographic region but all linked to switching and control devices. A particular cell site is able to provide communication to the subscriber units within the cell's service coverage area. By interconnecting and distributing such cells in an adjacent fashion, a much broader, combined coverage area is created. Subscriber units anywhere in this combined area, then, are able to obtain communication through the cell site of at least one of the cells. Such a subscriber unit may be traveling across the system while involved in communication. The subscriber unit's communication will be provided by a serving cell, but as the unit approaches the edge of this cell's coverage area the communication must be handed-off to another cell if it is to be maintained.

Handing-off communication between cells is known in multi-cell communication systems. Subscriber units are provided with a neighbor cell list from the FNE whenever a communication is established and also when a communication is handed-off. The neighbor cell list serves as a list of possible hand-off targets for the subscriber unit. Problems arise, however, when a subscriber unit is prevented from handing-off to cells in its neighbor cell list. This may occur because the neighbor cell is congested and has no available resources. The serving cell will continue to provide the subscriber unit communication, but if the unit continues moving away from the serving cell radio reception problems will reduce the quality if not terminate the communication altogether. A multi-cell radio communication system can truly provide broad communication coverage only if the communication units are able to successfully hand-off to neighboring cells.

As multi-cell systems mature to support the explosive growth in the number of subscriber units, cells are becoming smaller. For example, additional cells are being added to cover particularly dense areas such as office buildings and stadiums. The result is much greater overlap in the coverage areas of individual cells. It is not uncommon for a cell's coverage area to extend well into the coverage area of a second cell.

This poses two problems for hand-offs facilitated by neighbor cell lists as they are used today. The additional overlapping of cells makes for longer and longer neighbor cell lists. Longer neighbor cell lists consume more bandwidth each time they are transmitted and consume more subscriber unit processing and memory resources to manage. Secondly, a subscriber unit is provided only with the neighbor cell list of the serving cell, but it may travel completely across a neighbor cell without handing-off the communication provided by the serving cell. The subscriber unit may well be within the coverage areas of cells which are not in its neighbor cell list, and to which it could possibly hand-off were these cells not absent from its neighbor cell list.

Therefore, a need exists for a method to provide subscriber units with improved hand-off techniques which overcome the deficiencies of the prior art.

DESCRIPTION OF A PREFERRED EMBODIMENT

Generally, the present invention encompasses a method for improving the communication coverage in multi-cell communication systems which employ neighbor cell lists. The FNE of a particular cell site provides the communication units in its cell with communication and neighbor cell lists. The neighbor cell list informs the communication unit of other cells which are possible hand-off targets. When the FNE, through one of a number of means, detects that a particular communication unit has entered the service coverage area of another cell and/or is in need of a channel in another cell but is denied access, it sends the communication unit the neighbor cell list related to the new cell. By providing the communication unit with a new neighbor cell list, the communication unit can now attempt to maintain its communication by handing-off to other cells unknown before. In this manner the effective communication coverage of the system is improved. Also, this method of updating the communication unit with a new neighbor cell list allows the neighbor cell lists to minimally contain those cells with coverage areas immediately adjacent to the present cell. If a new neighbor cell list were not provided, the original neighbor cell list would have to include non-adjacent cells in order to accomplish the same increased coverage.

Figures 1, 2, 3:
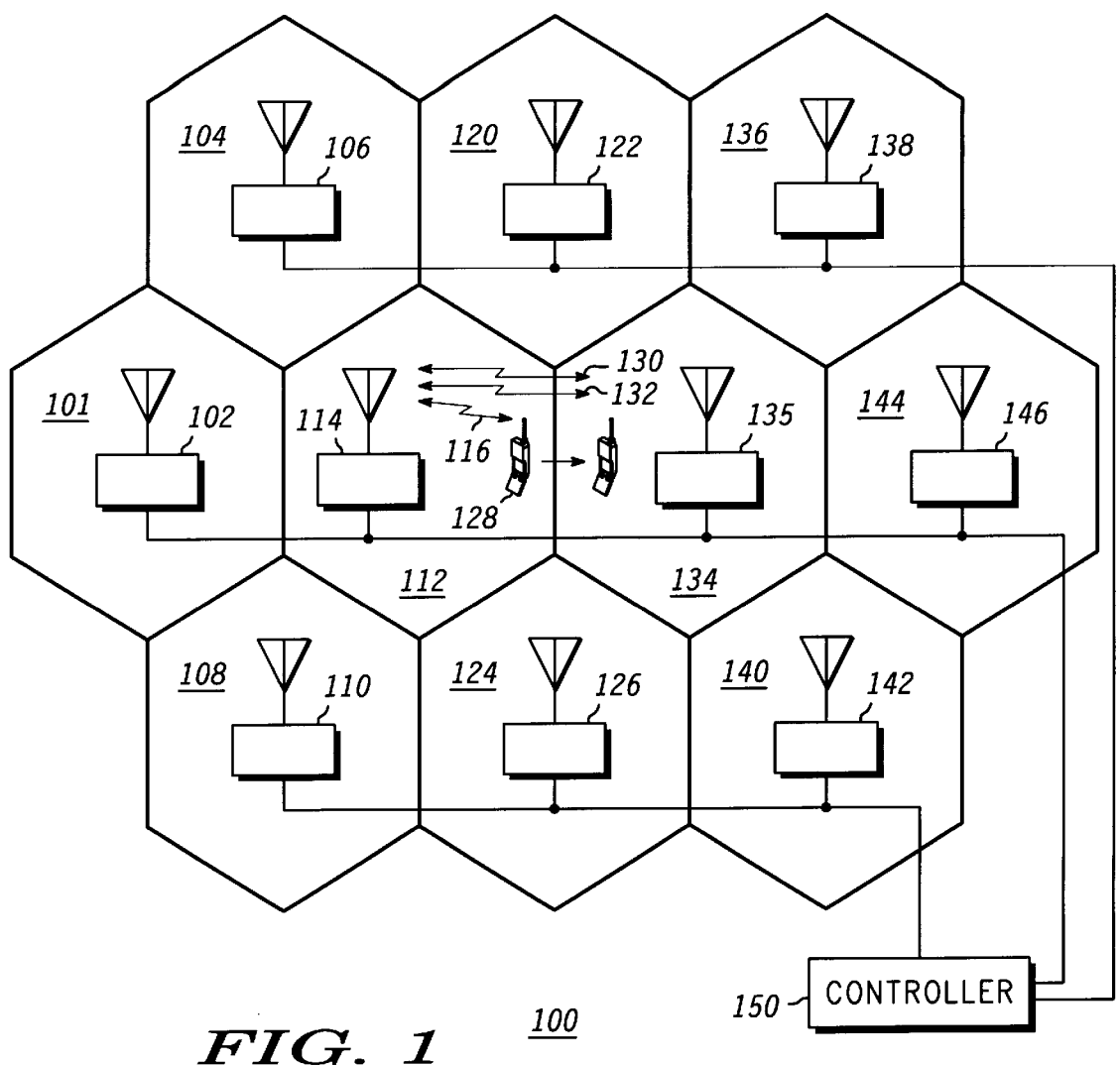
FIG. 1 illustrates a multi-cell communication system in accordance with a preferred embodiment of the present invention.
FIG. 2 illustrates a first representative neighbor cell list for a typical cell.
FIG. 3 illustrates a second representative neighbor cell list for a typical cell.

The present invention can be more fully understood with reference to FIGS. 1–7. FIG. 1 illustrates a multi-cell communication system 100 in accordance with a preferred embodiment of the present invention. The multi-cell communication system 100 comprises at least one communication unit 128 and a plurality of cell sites 102, 106, 110, 114, 122, 126, 135, 138, 142, 146 coupled to a communications controller 150. Preferably, the multi-cell communication system 100 comprises an "iDEN" communication system that is commercially available from Motorola, Inc. of Schaumburg, Illinois. Accordingly, the communication unit 128 preferably comprises any one of the many "iDEN" phones. The cell sites 102, 106, 110, 114, 122, 126, 135, 138, 142, 146 and communication controller 150 preferably comprise "iDEN" infrastructure components distributed in such a manner as to form a broad communication coverage area comprising a plurality of cells 101, 104, 108, 112, 120, 124, 134, 136, 140, 144. The equipment comprising the cell sites 102, 106, 110, 114, 122, 126, 135, 138, 142, 146 and controller 150 is referred to as the fixed network equipment (FNE) of the multi-cell communication system 100.

Figure 4:
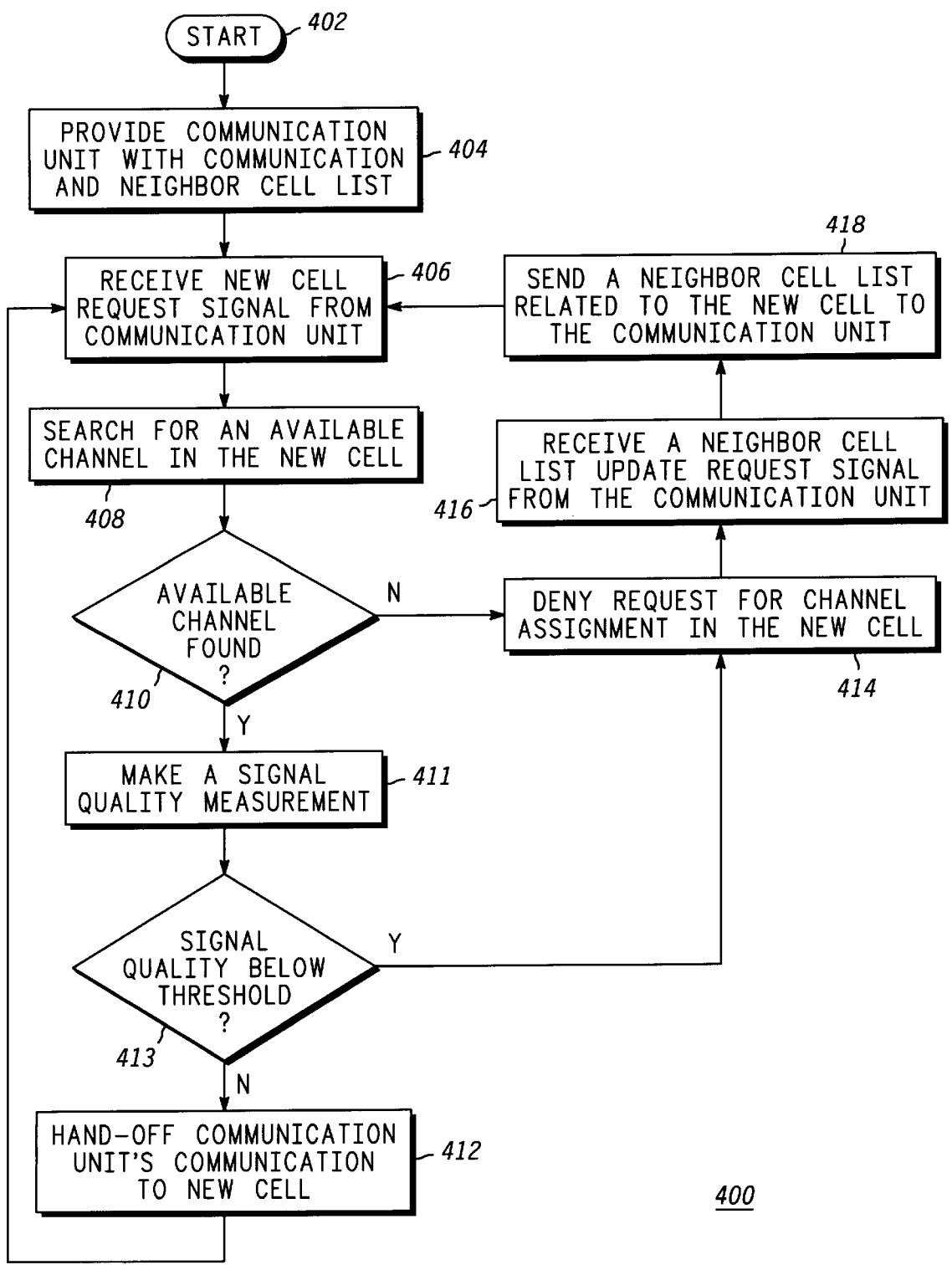
FIG. 4 illustrates a logic flow diagram of steps executed by FNE to provide neighbor cell lists to a communication unit in a preferred embodiment of the present invention.
Figure 5:
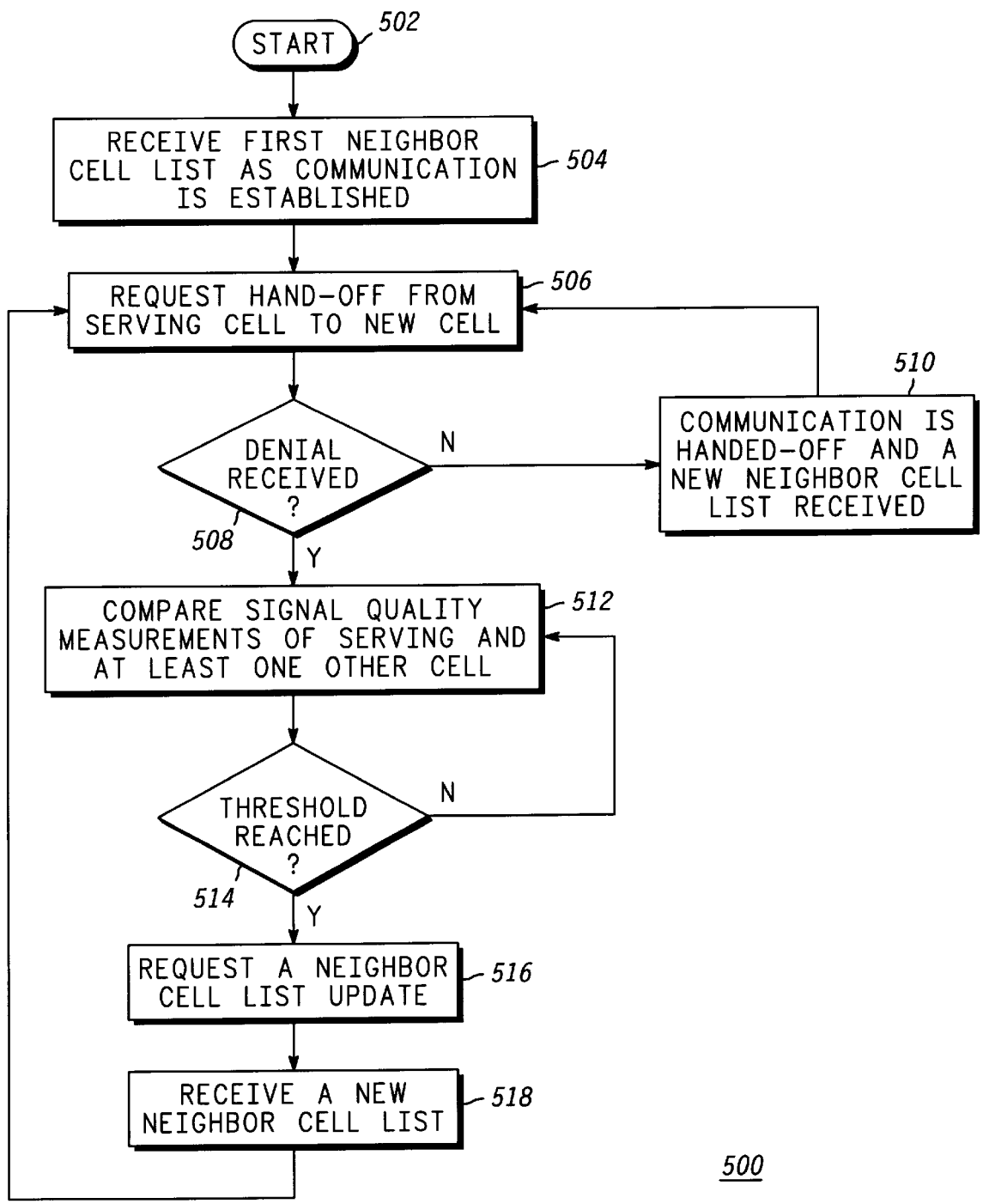
FIG. 5 illustrates a logic flow diagram of steps executed by a communication unit to obtain neighbor cell lists in a preferred embodiment of the present invention.

The operation of the preferred embodiment of the multi-cell communication system 100 as is related to the present invention will be described using FIGS. 1–5. FIGS. 4 and 5 are logic flow diagrams of the steps executed by the FNE and the communication units, respectively, to effectively distribute neighbor cell lists in a preferred embodiment of the present invention. Since the steps in these logic flows, those executed by the FNE and those by a communication unit are often complementary, they will be discussed together. The logic flow diagram 400 begins 402 when the FNE provides (404) the communication unit 128 in the first cell 112 with communication 116 via cell site 114 including a first neighbor cell list 200 (FIG. 2) with limited entries. Likewise, logic flow diagram 500 begins 502, when communication 116 is established with the communication unit 128 in the first cell 112 and the communication unit 128 receives (504) a first neighbor cell list 200 related to the first cell 112. The neighbor cell list 200 contains the outbound communication channel radio frequencies of the cells 101, 104, 120, 134, 124, 108 with adjacent coverage areas to cell 112. Neighbor cell list 200 has limited entries in the sense that only frequencies of the adjacent cells are included. To provide communication 116 to the communication unit 128 the FNE must perform call setup processing to allocate a communication channel in its cell 112. In the preferred embodiment, the multi-cell communication system 100 comprises a time division multiple access (TDMA) communication system and the communication channel accordingly comprises a time slot of a radio frequency carrier. However, in an alternative embodiment, the communication channel might comprise a radio frequency carrier (e.g., in a frequency division multiple access (FDMA) communication system) or an orthogonal code (e.g., in a code division multiple access (CDMA) communication system). Generally, call setup processing involves processing a call request issued by the initiator of the communication, determining the communication participants, and allocating the system resources necessary to establish the communication paths. Call setup techniques are well known, and thus, will not be discussed further.

Cell 112 of cell site 114 which is providing communication 116 for the communication unit 128 is the serving cell while it provides this communication 116. In the preferred embodiment, as the communication unit 128 moves toward the edge of the service coverage area of serving cell 112 (as denoted in FIG. 1 by the arrow), the communication unit 128 may send a new cell request signal 130 to cell site 114. In the preferred embodiment, the communication unit 128 is continuously making signal quality estimate (SQE) and received signal strength indication (RSSI) measurements of the serving cell communication channel and the channels of the neighbor cells, as contained in the list 200. When the difference in signal quality measurements between the serving cell and a neighbor cell meet the hand-off criteria, the new cell request signal 130 is sent to cell site 114 of the serving cell 112. This new cell request signal 130 includes the signal quality measurements for generally not more than the best two hand-off candidates from neighbor cell list 200. The FNE, then, detects when a new cell assignment is desired by receiving the new cell request signal 130 from the communication unit 128 which includes at least one signal quality measurement made by the communication unit 128.

In an alternative embodiment, however, the FNE may detect that a communication unit's communication should be handed-off to another cell without a new cell request signal from the communication unit. In such an embodiment, the communication unit would receive a new cell request signal from the FNE. The FNE, in one such embodiment, may detect that a new cell assignment for a communication unit is desirable as a result of at least one signal quality (e.g., SQE and/or RSSI) measurement being made. This may be of the outbound signal, where the communication unit makes the measurement and then sends it to the FNE, or of the inbound signal, where the FNE of one or more of the cells makes the measurement. The FNE, in another such alternative embodiment, may detect that a new cell assignment is desirable as a result of the geographical location of a communication unit being determined. Determining the geographical location of a communication unit also may be performed by either the FNE or by the communication unit which would subsequently send its geographical location to the FNE. How such a determination may be made will be discussed in more depth later herein.

In a preferred embodiment, again, detecting when a communication unit is in need of a channel in a new cell is performed by receiving a new cell request signal. The communication unit 128 based on signal quality measurements determines a hand-off is needed and requests (506) a hand-off from the serving cell 112 to another cell. The FNE receives (406) the new cell request signal 130 from the communication unit 128 via cell site 114. This new cell request signal 130 includes at least one signal quality measurement of at least one of the neighbor cell list hand-off candidates for communication unit 128. The communication unit 128 is requesting to operate in a second cell or, in other words, requesting a communication channel in a second cell. The FNE now searches (408) for an available communication channel. If (410) the search for an available communication channel is unsuccessful, the FNE must deny (414) the communication unit 128 access to a new cell. If (410) instead, the search for an available channel is successful, a signal quality measurement is made (411) of the inbound signal by the cell site with the available channel. If (413) the signal quality measurement made is below a hand-off threshold, the request for the communication unit 128 to operate in a second cell is denied (414). Otherwise, if (413) the signal quality measurement is not below a hand-off threshold, the request to operate in a second cell is granted and a hand-off to the available channel occurs (412). When (508) this hand-off occurs, the cell site of this second cell sends the communication unit a new neighbor cell list related to this second cell. The communication unit upon handing-off continues its communication via its new serving cell, the second cell, and receives (510) the new neighbor cell list. Since mobile-assisted hand-off techniques are well known they will not be discussed in any greater detail. Since the present invention is more concerned with situations where a hand-off is denied, regardless of reason, more details will follow on how the communication continues despite a denial.

In the preferred embodiment, the denial of a new cell assignment may result from a signal quality measurement made by the FNE. In alternate embodiments, however, a communication unit may deny a new cell assignment made by the FNE. Upon receiving a new cell assignment, a communication unit may make at least one signal quality measurement of one or more cell site outbound channels and determine that the new cell assignment should be rejected.

Upon receiving a denial (508) to hand-off to another cell, the communication unit 128, in the preferred embodiment, continues making signal quality measurements of the outbound channels of serving cell 112 and neighbor cells, list 200. The communication unit 128 continues comparing (512) signal quality measurements of the serving cell 112 and at least one other cell until (514) the difference between the signal quality measurements of the serving cell 112 and another cell reaches a neighbor cell list update threshold. When this neighbor cell list update threshold is reached, communication unit 128 has determined a new neighbor cell list is needed. To request a neighbor cell list update, communication unit 128 sends (516) a neighbor cell list update request 132 to the FNE via cell site 114. This neighbor cell list update request 132, in the preferred embodiment, indicates the cell for which a neighbor cell list is requested. The cell indicated would be the cell whose outbound channel signal quality measurement exceeded that of the serving cell by more than the update neighbor cell list threshold. This could, of course, be any of the neighbor cell list 200 cells, but for the sake of illustration, cell 134 will be assumed to be the cell indicated in the neighbor cell list update request 132.

Upon receiving (416) the neighbor cell list update request 132 indicating the cell for which a neighbor cell list is requested, cell 134, the FNE via cell site 114 sends (418) a neighbor cell list 300 related to the second cell 134 to the communication unit 128. Communication unit 128, then, receives (518) this second neighbor cell list 300. Neighbor cell list 300 related to cell 134 contains the outbound communication channel radio frequencies of the cells 112, 120, 136, 144, 140, 124 with adjacent coverage areas to cell 134. Neighbor cell list 300 is sent even though the new cell can not be assigned. Since in the prior art, a communication unit would only receive a neighbor cell list related to another cell after handing-off, a hand-off denial results in no update to the neighbor cell list. A new neighbor cell list would provide such a communication unit new hand-off candidates to which a hand-off may be granted. When a hand-off is granted to a cell only contained in the new neighbor cell list, the effective coverage of the communication system is improved. To gain this improved coverage without providing a new neighbor cell list would require including at least some of the new neighbor cell information in the first neighbor cell list. So by providing the communication unit with a new neighbor cell list related to the new cell, including the new neighbor cell information in the first neighbor cell list was avoided. In this way the length of neighbor cell lists are minimized by limiting their entries to at most cells adjacent to a serving cell. By executing the steps illustrated in flow diagrams 400 and 500, a communication unit in a preferred embodiment of the present invention is provided an updated neighbor cell list with limited entries as it moves across a multi-cell communication system regardless of cell access concerns.

So far, it has been shown that the sending of a neighbor cell list update request by a communication unit and the subsequent sending of a new neighbor cell list by the FNE is preceded by detecting when a new cell assignment is desired by the communication unit and that new cell assignment then denied. In an alternative embodiment, however, detecting when a new cell assignment is desired by a communication unit may need to be performed repeatedly. Such repeated detections, where repeatedly the new cell assignment is denied, would produce a quantity of hand-off denials for this communication unit. In such an alternate embodiment, then, a hand-off denial threshold would be established and the quantity of hand-off denials compared to this threshold. Reaching this threshold in the quantity of hand-off denials would be necessary before sending a new neighbor cell list to the communication unit still denied the ability to hand-off. In an alternative embodiment in which communication units send their hand-off requests to the FNE, a communication unit would repeatedly request to be handed-off and repeatedly receive denials to hand-off producing a quantity of hand-off denials. This communication unit would then determine a new neighbor cell list is needed when the quantity of hand-off denials reaches a threshold. The quantity of hand-off denials is, of course, produced by counting the number of hand-off denials. This counting of hand-off denials could be performed by either the FNE or the communication unit. If the FNE is counting hand-off denials, a new neighbor cell list could be sent upon reaching the hand-off denial threshold. Likewise, if the communication unit is counting hand-off denials, a neighbor cell list update request could be sent upon reaching the hand-off denial threshold.

Figure 6:
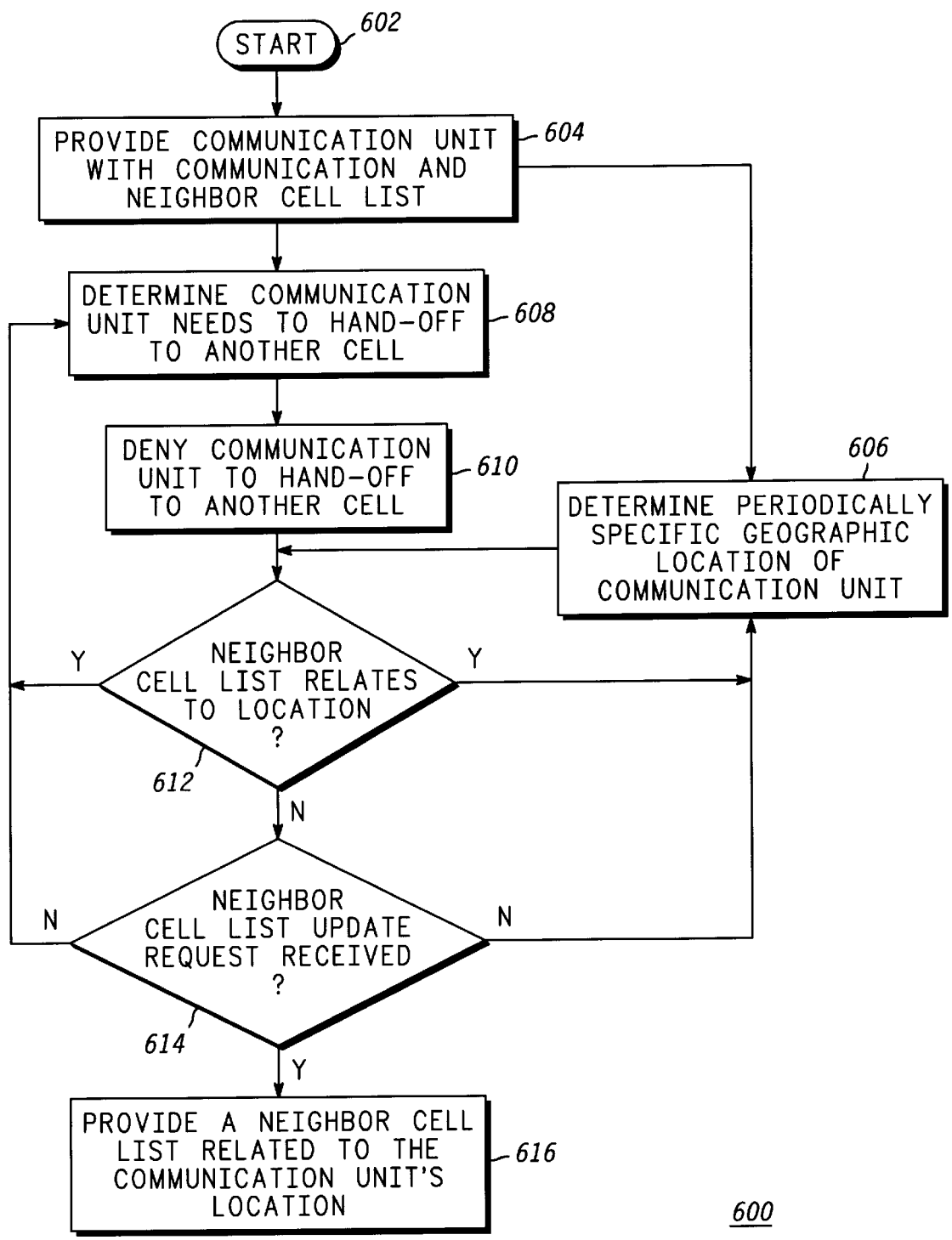
FIG. 6 illustrates a logic flow diagram of steps executed by fixed network equipment (FNE) to provide neighbor cell lists to a communication unit in an alternative embodiment of the present invention.
Figure 7:
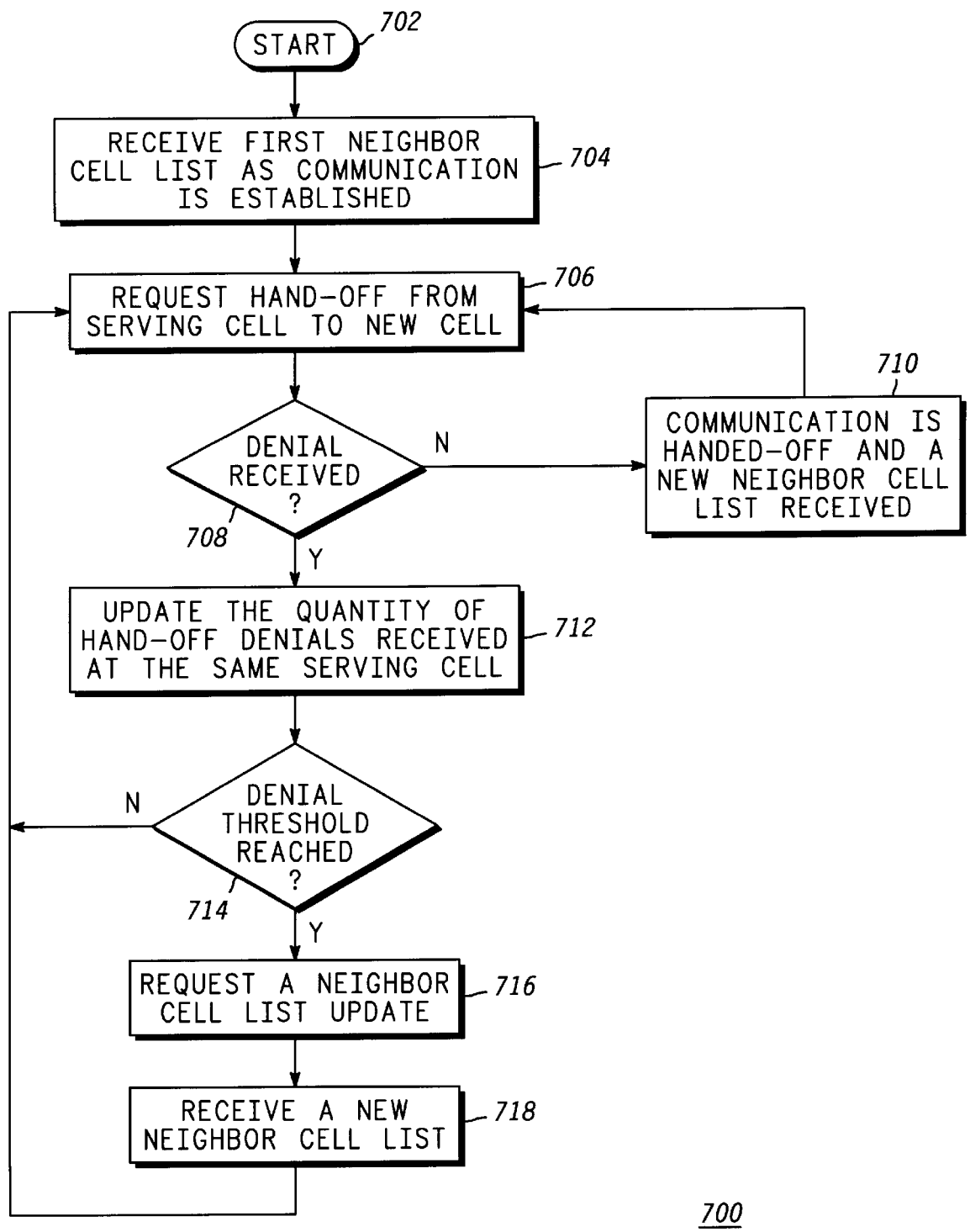
FIG. 7 illustrates a logic flow diagram of steps executed by a communication unit to obtain neighbor cell lists in an alternative embodiment of the present invention.

FIGS. 6 and 7 illustrate logic flow diagrams of steps executed by a multi-cell communication system in an alternative embodiment of the present invention. The steps of logic flow diagram 600 are executed by the FNE and the steps of logic flow diagram 700 are executed by a communication unit. Logic flow diagram 600 begins 602 with the FNE providing (604) communication and a first neighbor cell list to the communication unit. Likewise, logic flow diagram 700 begins 702 with the communication unit receiving the first neighbor cell list as the communication is established. The FNE now begins determining periodically (606) the geographical location of the communication unit to a greater specificity than that of a cell site service coverage area. Geographical location can be determined with varying precision. For example, by engaging in communication via a particular cell site within the system, the geographical location of the communication unit is known to be somewhere in the service coverage area of the particular cell. Geographical location can be determined with greater specificity by the use of commercially available devices like global positioning system (GPS) receivers. Also, distances from the known locations of three or more cell sites can be determined from signal propagation delays, and thus a geographic location computed by known mathematical methods. Determining periodically the geographical location of the communication unit, then, may be performed by determining a distance between the communication unit and at least three cell site locations. Alternately, the communication unit may contain a GPS receiver, for example, which determines the geo-coordinates of the communication unit. The communication unit would need to notify the FNE of its location periodically. It may also include its current geographical location in other messaging such as neighbor cell list update requests. So the FNE would, then, periodically determine the geographical location of the communication unit by receiving geo-coordinates from the communication unit.

The communication unit engaged in communication on a channel in a first cell may determine that a hand-off is needed. How such a determination may be made is discussed above with regard to the preferred embodiment. The communication unit would then request (706) a hand-off from the first cell in the form of a new cell request message. Now the FNE upon receiving this new cell request message determines (608) that the communication unit needs to hand-off from the channel in the first cell to a channel in a second cell. The FNE, if a number of conditions as discussed with regard to the preferred embodiment are met, grants the hand-off to a channel in a second cell. The communication unit hands-off (710) the communication to the channel in the second cell and receives a neighbor cell list related to the second cell. Instead, if all the hand-off conditions are not met, the FNE will deny (610) the communication unit access to the channel in the second cell.

In the alternative embodiment of FIGS. 6 and 7, the communication unit upon receiving the denial (708) from the FNE updates (712) its count of the number of denials received from this serving cell during this communication. The communication unit then compares its count to a hand-off denial threshold. If (714) the hand-off denial threshold has not been reached, the communication unit returns to again requesting (706) a hand-off to a new cell. If (714) instead, the hand-off denial threshold has been reached, the communication unit sends (716) a neighbor cell list update request to the FNE. In this alternative embodiment, where the communication unit is repeatedly requesting to hand-off, the FNE is, therefore, repeatedly determining (608) that the communication unit needs to hand-off from the channel in the first cell to a channel in a second cell and is repeatedly denying (610) the communication unit access to the channel in the second cell. The FNE is also determining periodically the geographical location of the communication unit. As the FNE cycles through these steps, it is determining (612) whether the first neighbor cell list still relates to the current geographical location of the communication unit and also determining (614) whether a neighbor cell list update request has been received from the communication unit. When the first neighbor cell list no longer relates to a current geographical location of the communication unit and a neighbor cell list update request has been received from the communication unit, the FNE provides (616) the communication unit with a second neighbor cell list related to the current location of the communication unit. Having received (718) a new neighbor cell list the communication unit still maintaining its communication via the serving cell can now attempt to hand-off to one of the new cells.

As discussed above, the counting of hand-off denials may be performed by either the FNE or the communication unit. In the alternative embodiment just discussed, the communication unit counted the number of hand-off denials and when the threshold was reached, sent a neighbor cell list update request to the FNE. In an embodiment where the FNE performed the counting, the FNE would be repeatedly determining that the communication unit needs to hand-off from the channel in the first cell to a channel in a second cell and repeatedly denying the communication unit access to the channel in the second cell to produce a quantity of hand-off denials. A second neighbor cell list would then be provided the communication unit when the first neighbor cell list no longer related to the current geographical location of the communication unit, and when the quantity of hand-off denials reached a threshold.

Updating the neighbor cell list of a communication unit may also be performed based on the geographic location of the communication unit alone. A first neighbor cell list is provided to a communication unit; the geographical location of the communication unit is periodically determined; and when the first neighbor cell list no longer relates to the geographical location, a second neighbor cell list related to the geographical location of the communication unit is provided. Such an embodiment would have a number of disadvantages over others which additionally depend on signal quality measurements and/or the number of hand-off denials to ensure a neighbor cell list is updated only when it is truly needed. Such an embodiment might be modified to also update neighbor cell lists upon receiving neighbor cell list update requests from communication units. Here the step of determining that the first neighbor cell list no longer relates to a current location of the communication unit would further comprise the step of receiving a neighbor cell list update request from the communication unit. Receiving the neighbor cell list update request would indicate that the first neighbor cell list no longer relates to the current location of the communication unit.

The present invention encompasses a method for improving the communication coverage of a multi-cell communication system. With this invention, communication units involved in communication but unable to hand-off to another cell as they move away from the serving cell are provided new neighbor cell lists. The reception of the new neighbor cell list in a new cell where access has been denied avoids the loss of the ongoing communication which occurs when the communication unit is unaware of its current neighbor cell list. The new neighbor cell lists make known to the communication units all cells which are now possible hand-off targets. Increasing the likelihood that the communication unit will find a cell to which to hand-off, rather than losing the continuing communication, increases the effective coverage area of the system. Also, providing new neighbor cell lists without requiring communication units to first hand-off, allows neighbor cell lists to contain only those cells whose coverage areas are immediately adjacent to the current cell without sacrificing effective coverage. Thus, the length of neighbor cell lists are generally minimized hence reducing the memory size needed to store them.

While the present invention has been particularly shown and described with reference to particular embodiments thereof, it will be understood by those skilled in the art that various changes in form and details may be made therein without departing from the spirit and scope of the present invention.

We claim:

1. In a multi-cell communication system, a method of improving communication coverage, comprising:

providing a first neighbor cell list to a communication unit wherein the communication unit is engaged in a comnmunication on a channel in a first cell;

determining periodically a geographical location of the communication unit to a greater specificity than that of a cell site service coverage area;

determining that the first neighbor cell list no longer relates to a current geographical location of the communication unit that is determined to a greater specificity than that of a cell site service coverage area;

repeatedly determining that the communication unit needs to hand-off from the channel in the first cell to a channel in a second cell;

repeatedly denying the communication unit access to the channel in the second cell to produce a quantity of hand-off denials; and providing the communication unit with a second neighbor cell list related to the current geographical location of the communication unit, wherein the step of providing the communication unit with a second neighbor cell list comprises the step of providing the communication unit with a second neighbor cell list when the first neighbor cell list no longer relates to a current geographical location of the communication unit and the quantity of hand-off denials reaches a threshold.

2. The method of claim 1, wherein the step of determining periodically a geographical location of the communication unit comprises the step of receiving geo-coordinates from the communication unit.

3. The method of claim 1, wherein the step of determining periodically a geographical location of the communication unit further comprises the step of determining a distance between the communication unit and at least three cell site locations.

4. The method of claim 1, wherein the step of determining that the first neighbor cell list no longer relates to a current location of the communication unit further comprises the step of receiving a neighbor cell list update request from the communication unit.

5. The method of claim 4, wherein the neighbor cell list update request includes a current geographical location of the communication unit.

6. The method of claim 1, wherein the step of providing the communication unit with a second neighbor cell list comprises the step of providing the communication unit with a second neighbor cell list when the first neighbor cell list no longer relates to a current geographical location of the communication unit and a neighbor cell list update request has been received from the comnmunication unit.

7. In a multi-cell communication system having a plurality of communication units, a method of improving communication coverage, comprising the steps performed in at least one of the plurality of communication units:

receiving a first neighbor cell list;

requesting a hand-off from a serving cell to another cell;

receiving a denial to hand-off to another cell;

determining a new neighbor cell list is needed;

requesting a neighbor cell list update; and receiving a second neighbor cell list;

wherein the step of requesting a hand-off to another cell comprises the step of repeatedly requesting to be handed-off; wherein the step of receiving a denial to hand-off to another cell comprises the step of repeatedly receiving denials to hand-off producing a quantity of hand-off denials; and wherein the step of determining comprises the step of reaching a threshold in the quantity of hand-off denials.

8. The method of claim 7, wherein the step of determining comprises comparing signal quality measurements of the serving cell and at least one other cell.

* * * * *